United States Patent [19]

Haussels

[11] 3,815,173

[45] June 11, 1974

[54] CASTER FOR PIECES OF FURNITURE AND THE LIKE

[75] Inventor: Berthold Haussels, Wermelskirchen-Tente, Germany

[73] Assignee: Firma Happe & Co., Tonisheibe, Germany

[22] Filed: Dec. 30, 1971

[21] Appl. No.: 214,178

[30] Foreign Application Priority Data

Dec. 30, 1970 Germany .............................. 2064359

[52] U.S. Cl. ..................................... 16/45, 16/107
[51] Int. Cl. ............................................ A47b 91/00
[58] Field of Search... 16/45, 107; 301/63 D, 63 PS, 301/63 PW; 152/49, 310, 402, 403

[56] References Cited
UNITED STATES PATENTS

| 285,836 | 10/1883 | Otis | 16/45 |
| 1,120,552 | 12/1914 | Sherman et al. | 152/402 |
| 2,709,471 | 5/1955 | Smith et al. | 301/63 D |
| 2,896,687 | 7/1959 | Smith et al. | 152/310 |
| 2,943,889 | 7/1960 | Woldring et al. | 16/45 |

Primary Examiner—Bobby R. Gay
Assistant Examiner—Doris L. Troutman
Attorney, Agent, or Firm—Karl F. Ross; Hebert Dubno

[57] ABSTRACT

A rubber-tired caster for pieces of furniture or the like is peripherally encased in a ring of rigid sheet material, such as polyamide film, to facilitate moving over carpeted floors. For use on wood or other hard surfaces, the ring can be stripped off, allowing the compressed rubber rim to expand to substantially the same diameter.

6 Claims, 6 Drawing Figures

PATENTED JUN 11 1974 3,815,173

CASTER FOR PIECES OF FURNITURE AND THE LIKE

My present invention relates to a caster for the support of movable loads, such as pieces of furniture, which are to be rolled over different types of floor surfaces.

For wooden floors and other hard surfaces, on which the use of a completely inelastic caster (e.g. of pressed sheet steel or synthetic resin) would cause objectionable noise and vibrations, it is customary to use rubber-tired casters, i.e., wheels whose disk-shaped body has a peripheral groove wherein a rim of natural rubber or equivalent elastomeric material is projectingly seated. Such rubber-tired casters, however, are less suitable for use on carpeted floors or rugs since the rubber tends to cling to the textile fibers which are therefore subjected to considerable wear. This is particlarly true of swivelable casters, e.g. as used on living-room or office chairs, which often occupy a position transverse to the direction in which the piece of furniture is to be shifted, with resulting damage to the textile material by the tearing of its fibers.

It is, therefore, the object of my present invention to provide an improved caster adapted to be used, either in its original form or with a minor structural change, on any type of floor surface normally encountered, with avoidance of the afore-described disadvantages.

This object is realized, pursuant to the present invention, by the provision of an outer ring of limitedly deformable, relatively inelastic sheet material encasing the elastomeric rim of a caster of the rubber-tired type.

Such a ring of sheet material, preferably a hard polyamide, reduces the friction between the elastomeric rim or felly and the underlying textile floor covering which therefore is subject to considerably less wear than with conventional rubber-tired casters. The outer ring, being flexible, does not materially lessen the sound-absorbing and vibration-damping character of the elastic rim so that noises or shocks are suppressed even when the load supported by the caster is rolled over a hard floor. If, however, the load is to be moved primarily over surfaces of wood, concrete or the like, the protective ring can be readily removed by simple manipulation, as by being cut with a knife, file, pair of pliers or other commonly available tool. For this purpose, according to a further feature of my invention, the ring is advantageously provided with a discontinuity facilitating its removal, e.g. with a recess proximal to the rubber rim embraced thereby. This recess may be occupied by a protective insert, such as a metal plate, to prevent the severing tool from accidentally cutting into the underlying rubber.

In order to eliminate the risk of spontaneous separation of the outer ring from the elastic rim, I prefer to make the inner diameter of the ring somewhat smaller than the outer diameter of the rim in its normal, uncompressed state so that this rim is subject to uniform radial compression when the ring is fitted around it. The thickness of the ring may be so chosen that its outer diameter substantially equals that of the uncompressed ring so that the size of the caster, and therefore the height of the supported piece of furniture above the floor, remains virtually unchanged when the ring is removed. Such removal may be carried out by a distributor, by a salesman in a store, or by the ultimate consumer.

The above and other features of my present invention will be described in detail hereinafter with reference to the accompanying drawing in which.

Figure 6:
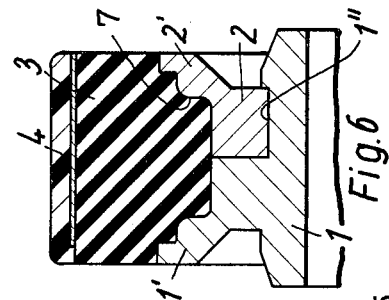
FIGS. 3 – 6 are cross-sectional views of part of the caster during successive stages of assembly.

The caster shown in the drawing comprises a wheel disk composed of two axially interfitted annular parts 1 and 2, part 1 forming a hub for a shaft of a swivel mounting not shown. This hub has a peripheral recess 1'' in which the complementary part 2 is received by a snap fit. Parts 1 and 2 are formed with respective flanges 1', 2' defining between them a peripheral groove 7 which accommodates a tire 3 of solid rubber.

Figure 2:
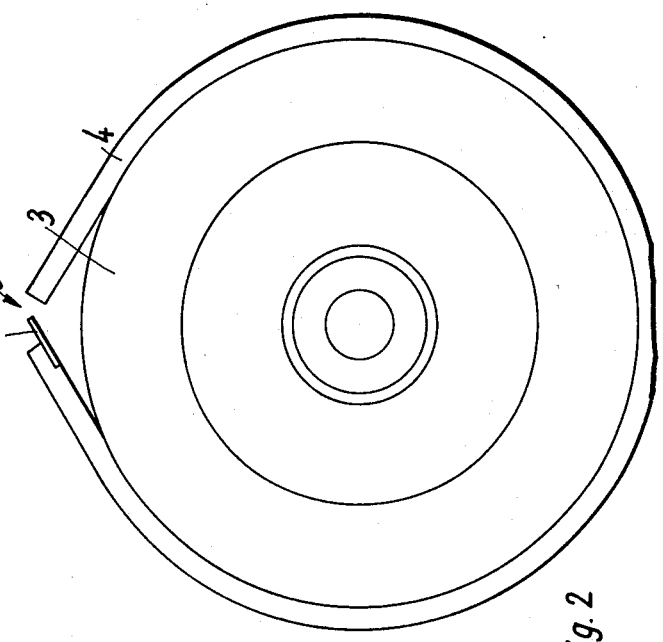
FIG. 2 is a view similar to FIG. 1, showing the caster in the process of removal of its outer ring.
Figure 1:
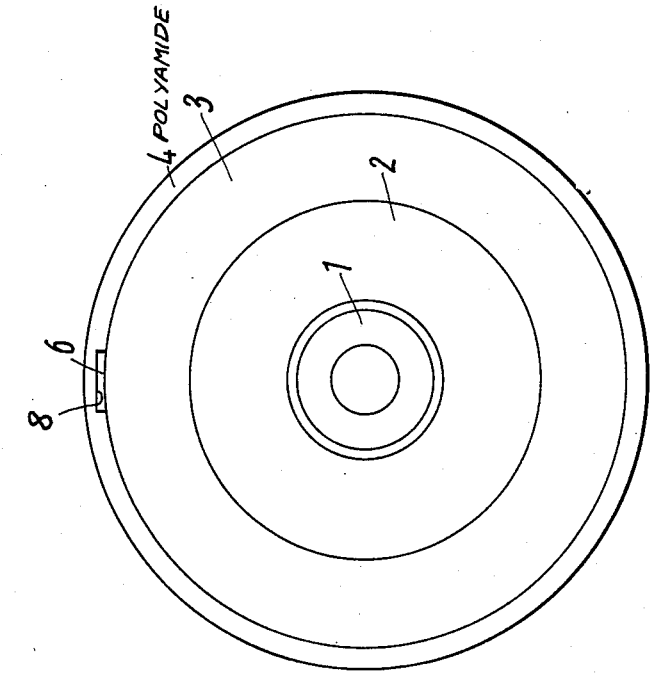
FIG. 1 is a side-elevational view of a caster embodying my invention.

In accordance with the present invention, an outer ring 4 of rigid polyamide is fitted under pressure about the elastic rim (or tire) 3 with which it is axially coextensive along their contact surface and which it engages only by friction, without adhesion bonding, to facilitate its removal. Ring 4 may have a thickness on the order of 1 mm so as to be deformable enough to transmit shocks and vibrations to the compressed tire 3. At 8 the ring 4 is undercut to form a recess next to the sole of tire 3, this recess being occupied by a protective metal plate 6 which allows the use of a tool to sever the ring 4 at a point 5, FIG. 2, without damage to the underlying rubber tire 3.

Figure 5:
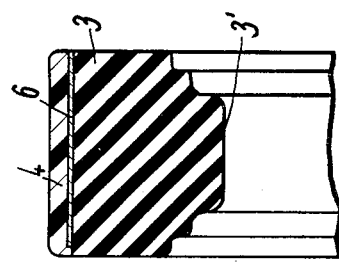
Figure 4:
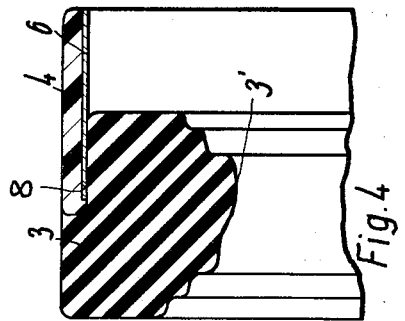
Figure 3:
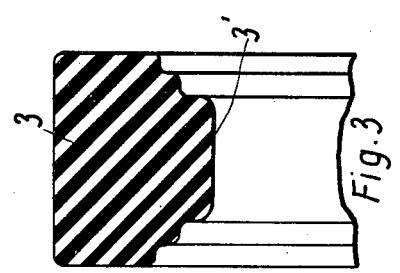

In the original assembly of my improved caster, I prefer to start with the unsupported tire 3 as illustrated in FIG. 3; this tire has an outer diameter equaling that of the ring 4 to be slipped thereon axially as shown in FIG. 4. When the ring 4 is applied, together with the protective insert 6, the outer periphery of tire 3 is squeezed radially inwardly with resulting deformation of its inner periphery 3'. Once the ring 4 is in place as shown in FIG. 5, the hub portion 1 of the wheel disk is introduced into the tire 3 from the left whereupon the snap ring 2 is inserted from the right to complete the assembly as illustrated in FIG. 6. Upon a subsequent cutting of ring 4 (FIG. 2) the tire 3 re-expands to maintain the diameter of the caster substantially constant.

In principle, sheet material other than synthetic resin could be used for the outer ring 4, including veneer or cardboad. I have found, however, that plastic sheets and especially polyamide foils are particulary advantageous because of their ability to preserve the cushioning effect of the elastomer to the fullest extent.

I claim:

1. A caster for the support of a movable load, comprising a rigid wheel body with a peripheral groove, a rim of elastomeric material projectingly seated in said groove, said rim having a substantially cylindrical outer peripheral surface, and a removable outer ring of hard polyamide concentrically surrounding said rim and frictionally engaging same under radial pressure over substantially the entire width of said peripheral surface.

2. A caster as defined in claim 1 wherein said ring is provided with a weakened portion facilitating its removal from said rim.

3. A caster as defined in claim 2 wherein said weakened portion forms a recess proximal to said rim, further comprising a protective insert in said recess.

4. A caster as defined in claim 1 wherein said wheel body comprises two axially adjoining annular parts together defining said groove and bracketing said rim between them.

5. A caster as defined in claim 4 wherein one of said parts is a snap ring interlockingly engaging the other of said parts.

6. A caster as defined in claim 1 wherein said rim is maintained by said ring under radial compression, said rim upon removal of said ring expanding to a diameter substantially equaling that of said ring.

* * * * *